United States Patent
Valbjoern et al.

(10) Patent No.: US 7,419,587 B2
(45) Date of Patent: Sep. 2, 2008

(54) WATER PURIFICATION DEVICE

(75) Inventors: Anders Valbjoern, Nordborg (DK); Palle Olsen, Nordborg (DK)

(73) Assignee: Danfoss A/S, Nordborg (DK)

( * ) Notice: Subject to any disclaimer, the term of this patent is extended or adjusted under 35 U.S.C. 154(b) by 544 days.

(21) Appl. No.: 10/761,746

(22) Filed: Jan. 21, 2004

(65) Prior Publication Data
US 2004/0149637 A1    Aug. 5, 2004

(30) Foreign Application Priority Data
Jan. 22, 2003    (DE)    ................... 103 02 580

(51) Int. Cl.
*B01D 61/12*    (2006.01)
(52) U.S. Cl. .................. 210/137; 210/321.65
(58) Field of Classification Search ............ 210/321.65, 210/137
See application file for complete search history.

(56) References Cited

U.S. PATENT DOCUMENTS

| | | | |
|---|---|---|---|
| 4,626,346 A | | 12/1986 | Hall |
| 4,909,934 A | * | 3/1990 | Brown et al. ................. 210/110 |
| 4,983,305 A | * | 1/1991 | Oklejas et al. ............... 210/642 |
| 5,127,926 A | | 7/1992 | Baker et al. |
| 6,139,740 A | | 10/2000 | Oklejas |
| 6,203,696 B1 | | 3/2001 | Pearson |
| 6,977,041 B2 | * | 12/2005 | Kim et al. ............... 210/321.65 |

FOREIGN PATENT DOCUMENTS

| | | |
|---|---|---|
| DE | 43 31 102 A1 | 3/1995 |
| DE | 4331102 A1 * | 3/1995 |
| DE | 19520912 A1 * | 12/1996 |
| DE | 19748997 A1 * | 5/1999 |
| DE | 198 18 692 C1 | 7/1999 |
| DE | 101 12 725 A1 | 10/2002 |
| EP | 0 397 332 B1 | 11/1990 |
| JP | 9-299944 | 11/1999 |

OTHER PUBLICATIONS

DE 10112725, Oct. 2, 2002, English translation.*
DE 19520912, Dec. 19, 2006, English translation.*
DE 4,331,102, Mar. 16, 1995, English translation.*
European Search Report for Serial No. EP 04 07 5046 dated Dec. 9, 2004.
"Automated Water-Purification System" NTIS Tech Notes, U.S. Department of Commerce, Springfield, VA, US, Apr. 1, 1989; pp. 278, 1-2.

* cited by examiner

*Primary Examiner*—Terry K Cecil
(74) *Attorney, Agent, or Firm*—McCormick, Paulding & Huber LLP

(57) ABSTRACT

A water purification device includes a fluid pump, a diaphragm unit having a diaphragm, which separates a primary side from a secondary side, and a consumer having a pressure requirement. The fluid pump is connected with the primary side and the consumer is connected with the secondary side. In order to supply the consumer with water under a high pressure, the fluid pump supplies the pressure (P2) for the consumer through the diaphragm. A pressure control valve is arranged upstream of the diaphragm unit to control the pressure on the primary side in dependence of the pressure on the secondary side.

12 Claims, 1 Drawing Sheet

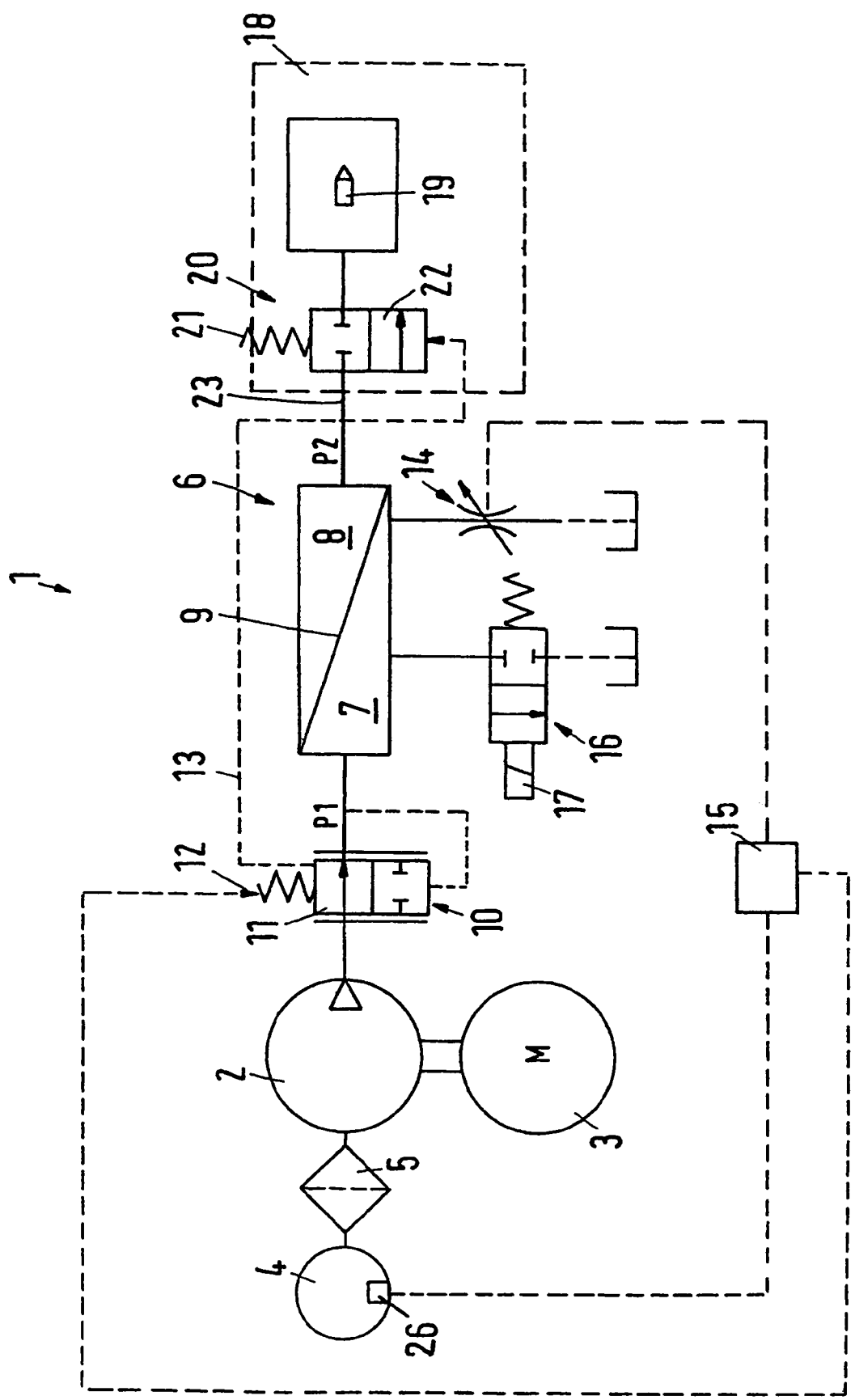

WATER PURIFICATION DEVICE

CROSS-REFERENCE TO RELATED APPLICATIONS

This application is entitled to the benefit of and incorporates by reference essential subject matter disclosed in German Patent Application No. 103 02 580.4 filed on Jan. 22, 2003.

FIELD OF THE INVENTION

The invention concerns a water purification device with a fluid pump, a diaphragm unit having a diaphragm, which separates a primary side from a secondary side, and a consumer having a pressure requirement, the fluid pump being connected with the primary side and the consumer being connected with the secondary side.

BACKGROUND OF THE INVENTION

A water purification device of this kind is known from U.S. Pat. No. 6,139,740. By means of the fluid pump, the fluid is pumped to the primary side under a relatively high pressure. According to the principle of reverse osmosis, the water then penetrates to the secondary side. During this penetration, the water is demineralised or purified. In order to simplify the following explanation, the water on the secondary side is merely called "secondary side water".

The secondary side water is usually collected in a tank, from which it is at the disposal of the consumer. The consumer then has the possibility of tapping the required amount of secondary side water on need.

In some applications, however, the consumer requires the secondary side water under a higher pressure. An example of such an application is a spraying system, with which plants can be irrigated. To enable the spraying of the secondary side water through orifices, higher pressures are required, for example more than 30 bar. A usual spraying pressure for secondary side water is even 70 bar. Another example of the application of secondary side water is the so-called water hydraulics, whose components are sold under the name of "NESSIE" by Danfoss A/S, Nordborg, Denmark.

In order to bring the secondary side water to the desired higher pressure, one or more pumps are used, which are arranged between the hold tank on the secondary side of the diaphragm unit and the consumer. This pump brings the secondary side water to the desired higher pressure. However, it has turned out that with demineralised water the required water pumps have a relatively short life. The life is substantially shorter than with the use of "normal" or unpurified water. Even with saltwater the life is longer.

SUMMARY OF THE INVENTION

The invention is based on the task of providing the consumer with secondary side water under higher pressure.

With a water purification device as mentioned in the introduction, this task is solved in that the fluid pump supplies the pressure for the consumer through the diaphragm.

This means utilising the fact that on the secondary side a high pressure is already available, which is immediately led to the consumer. In this case one single pump will be sufficient, which is arranged on the primary side of the diaphragm unit. This fluid pump can then pump mineral-containing or impurified water, which extends its life substantially.

Preferably, a control device is provided, which sets a pressure drop across the diaphragm at a predetermined value. This embodiment has at least two advantages. Firstly, the control of the pressure drop permits an influence on the efficiency of the diaphragm. The larger the pressure drop, the poorer is generally the efficiency. Secondly, also the life of the diaphragm can be positively influenced. With a smaller pressure drop, the life extends. Thus, the pressure drop across the diaphragm is chosen in dependence of the requirement and set accordingly. This will give a mode of operation of the water purification device with low costs.

In a preferred embodiment it is ensured that the primary side is connected with a pressure control device, which controls the pressure on the primary side in dependence of the pressure on the secondary side, and the consumer has a pressure inlet, which is connected to the secondary side. With this embodiment, the consumer receives the secondary-side water under a higher pressure, immediately from the outlet of the diaphragm unit secondary side. Accordingly, it is no longer necessary to bring the secondary-side water to a higher pressure by means of pumps. In a manner of speaking, the higher pressure on the secondary side is a "waste product" of the reverse osmosis. As, however, a certain pressure drop occurs through the diaphragm of the diaphragm unit, the pressure control device is provided, which controls the pressure on the primary side in dependence of the pressure on the secondary side. When thus a pressure on the secondary side is prescribed, then the pressure on the primary side is always controlled so that the desired or prescribed pressure on the secondary side can be achieved. Thus, the operation of the water purification device is connected with a somewhat increased control effort. However, one single fluid pump will do, which is arranged on the primary side of the diaphragm unit. This fluid pump pumps water, which is not yet demineralised or purified. Accordingly, the life of the pump is extended.

Preferably, the pressure control device has a control valve, which is arranged in a connection line between the fluid pump and the diaphragm unit. Thus, the control valve controls the flow of water to be purified to the diaphragm unit. The more the control valve opens, the higher gets the pressure on the primary side. When the control valve closes further, the pressure on the primary side drops. A condition for this is that the primary side has an outlet for the water to be purified, so that the flowing water can create a pressure drop at the control valve, which is responsible for the pressure on the primary side and thus for the pressure on the secondary side of the diaphragm unit.

It is advantageous that the control valve has a valve element, which is acted upon in the opening direction by the pressure on the secondary side and in the dosing direction by the pressure on the primary side. Additionally, an opening spring acts upon the valve element. The pressure drop across the diaphragm corresponds to the force of the opening spring acting upon the valve element. Thus, the pressure drop across the diaphragm, and thus also the pressure on the secondary side of the diaphragm unit, can be set in a simple manner.

Preferably, the primary side has a fluid outlet arrangement, in which is arranged an adjustable throttle. By means of the adjustable throttle, the volume flow of the outflowing primary-side water, and thus also the pressure on the primary side, can be set. This is a relatively simple manner of providing the desired pressure on the primary side of the diaphragm.

Preferably, a shiftable valve is arranged in parallel with the throttle. The shiftable valve can simply be in the form of an on/off valve, which is, for example, activated by a magnetic drive. The shiftable valve simplifies the cleaning of the primary side of the diaphragm unit. The shiftable valve can simply be opened and a large amount of the primary-side fluid led through the primary side of the diaphragm unit. This fluid can then remove impurities, which may have deposited on the primary side.

Preferably, the pressure control device controls the pressure on the primary side so that the pressure on the secondary side is in a range from 35 to 180 bar. This is a pressure range, in which many consumers, requiring an increased inlet pressure, can work.

It is also advantageous that the pressure control device controls the pressure on the primary side in dependence of the quality of the water to be purified. For example, the pressure difference across the diaphragm is smaller with drinking water than with impurified water. The highest pressure differences are required with saltwater. The control device can be switched over by the user, who knows the application area of the water purification device. Or, a sensor can be provided in the water source, which generates an output signal that is required for setting the pressure.

It is preferred that the pressure control device sets a pressure difference across the diaphragm as follows:
 with drinking water: 3 to 7 bar
 with impurified water: 7 to 30 bar
 with saltwater: 30 to 80 bar.

In these ranges, the desired effects of the reverse osmosis occur, so that secondary side water is available as substantially demineralised water.

Preferably, the consumer has a valve, which opens at a predetermined minimum pressure. Thus, it is ensured that the consumer can only receive or consume the secondary side water, when the secondary side water is available on the secondary side of the diaphragm unit with the desired pressure.

BRIEF DESCRIPTION OF THE DRAWINGS

In the following, the invention is described in detail on the basis of a preferred embodiment in connection with the drawing, showing:

The sole FIGURE is a schematic view of a water purification device

DETAILED DESCRIPTION OF THE PREFERRED EMBODIMENT

A merely schematically shown water purification device 1 has a pump 2, which is driven by a motor 3. The pump 2 exists in the form of a fluid pump, which pumps water from a source 4, for example a fresh water pipe, a water reservoir or from the sea. Preferably, the fluid pump 2 is a positive displacement pump of the axial piston type. Between the source 4 and the pump 2 is arranged a filter 5, which filtrates impurities from the water.

The pump 2 is a water pump. Such a pump 2 is available in the NESSIE product range of Danfoss A/S, Nordborg, Denmark. As long as the water from the source 4 has not yet been demineralised, the pump works satisfactorily with a sufficiently long life, also when the water has no lubricating properties, like other hydraulic fluids, for example hydraulic oil.

The device 1 has a diaphragm unit 6 with a primary side 7 and a secondary side 8. Between the primary side 7 and the secondary side 8 is located a diaphragm 9, only shown schematically. Shown is one single diaphragm unit 9. However, several diaphragm units can be arranged in parallel (not shown in detail), individual diaphragm units being connected or disconnected, for example in dependence of the consumption. For this purpose, solenoid valves can be used.

By means of the diaphragm 9, the water is demineralised or purified according to the principle of the reverse osmosis. For this purpose, the water must be available on the primary side 7 with a relatively high pressure. A share of the water then penetrates the diaphragm 9 and is then available on the secondary side 8 as secondary side water, which is, for example, desalinated, purified or generally demineralised.

Between the pump 2 and the primary side 7 of the diaphragm unit 6 is located a control valve 10 of a pressure control device. The control valve 10 has a valve element 11, which is acted upon in the closing direction by a pressure P1 on the primary side and in the opening direction by a pressure P2 on the secondary side 8 of the diaphragm unit 6. Alternatively, the pressure between the fluid pump 2 and the control valve 10 can act upon the valve element 11 in the closing direction. Thus, it can be achieved that a sudden pressure build-up has no damaging effect on the diaphragm 9. In principle, a "shock valve" can be realised with this embodiment. Additionally, an opening spring 12 acts upon the valve element 11 in the opening direction. In fact, the opening spring 12 defines the pressure drop across the diaphragm 9.

Between the secondary side 8 and the control valve 10 is located a signal line 13, which can, for example, transfer the pressure from the secondary side 8 to the control valve 10. However, it is also possible to use the signal line 13 for the transfer of other signals, for example, electrical signals, when a corresponding sensor or signal transmitter is located on the secondary side 8 and a drive reacting to a corresponding signal is located on the control valve 10. For example, pressure sensors can measure the pressures P1, P2, the resulting signals being led to a control device, which controls the motor driving the fluid pump 2. In this case, valves are not required. Instead of pressure sensors, flow sensors or other sensors can, of course, be used.

The primary side 7 has a fluid outlet arrangement, in which is located an adjustable throttle 14. By adjusting the throttle 14, the pressure on the primary side 7 can be changed. This change can be made manually. However, it is also possible to adjust the throttle 14 by means of a control device 15, which is connected with a sensor 26 detecting the quality of the water from the source 4. For example, it may be required to supply the water to the primary side 7 under a higher pressure, when the water is more heavily impurified or when saltwater is concerned. With drinking water, however, a lower pressure is required. As shown schematically, the control device 15 can also act upon the opening spring 12 to change the pressure difference across the diaphragm 9. With the control, it is possible to control the pressure drop across the diaphragm 9. This is advantageous, because the efficiency of the diaphragm 9 depends on the pressure drop. For example, at 20 bar the diaphragm has an efficiency of 80%, whereas at 65 bar the efficiency is only 35%. Further, the life of the diaphragm is reduced with a higher pressure drop.

Parallel to the throttle 14 is arranged a valve 16, for example a solenoid valve, which has a magnetic drive 17. As shown, this valve can be dosed, when the diaphragm unit 6 works, in order to demineralise the water. However, it can also be open, in order to permit a more or less unthrottled fluid flow through the primary side 7. With such a water flow, for example, impurities can be removed, which have deposited on the primary side 7 of the diaphragm unit 6. With such purification, both impurities and other undesired elements, for example minerals, are removed.

It has turned out that by means of the pressure control device a pressure P2 can be set on the secondary side 8 of the diaphragm unit 6, which is advantageously in the range of 35 to 180 bar. When purifying drinking water, the pressure drop across the diaphragm 9, that is, the difference P1 minus P2, is preferably in the range from 3 to 7 bar, when using impurified water preferably in the range from 7 to 30 bar and when using saltwater preferably in the range from 30 to 80 bar.

The secondary side 8 is connected with a pressure inlet 23 of a consumer 18, for example, an orifice unit with only schematically shown orifices 19, through which the demineralised water shall be sprayed. A predetermined pressure is required for spraying the water. Between the orifice unit 19 and the secondary side 8 a valve 20 can be located, which does not open until a predetermined pressure has been reached. This pressure is defined by a closing spring 21. A valve element 22 is acted upon against the force of the closing spring 21 by the pressure P2 on the secondary side 8. When the pressure P2 on the secondary side 8 exceeds the force of the closing spring 21, the valve element 22 is displaced so that the valve 20 opens.

The pressure control can, of course, also occur in that a valve (not shown) is located in the line between the secondary side 8 of the diaphragm unit 6 and the consumer 18. It is also possible to perform the pressure control by means of a valve, which is located on the outlet side of the primary side 7 of the diaphragm unit 6. In both cases, the pressure P1 on the primary side led to the valve.

The consumer 18 can also be made as a pressure store or an accumulator. The water purification device can also be used for supplying buildings or drains, located in high positions, for example a mountain hut, with water. The fluid pump 2 is then located in the valley and merely pumps "unpurified" water, the diaphragm unit 6 being located after the fluid pump 2, so that only purified water will reach the "top".

In a manner not shown in detail, safety components are of course arranged everywhere in the hydraulic system of the water purification device, where they are required. For example, a shock valve (overpressure valve) can be available on the outlet of the fluid pump 2 to avoid damaging of the pump, when the control valve 10 is dosed.

What is claimed is:

1. A water purification device comprising:
   a fluid pump;
   a diaphragm unit having a diaphragm, which separates a primary side from a secondary side; and
   a consumer having a pressure requirement;
   wherein the fluid pump is connected with the primary side and the consumer is connected with the secondary side, and the fluid pump supplies the pressure for the consumer through the diaphragm;
   wherein the primary side is connected with a pressure control device, which controls the pressure on the primary side in dependence on the pressure on the secondary side;
   wherein the pressure control device includes a control valve, which is connected to the diaphragm unit;
   wherein the control valve has a valve element, the valve element being acted upon by the pressure on the primary side in either an opening or a closing direction, and by the pressure on the secondary side in the other of the opening or the closing direction; and
   wherein the control valve is arranged in a connection line downstream of the fluid pump and upstream of the diaphragm unit.

2. The device according to claim 1, wherein the water purification device further includes a control device, which controls a pressure drop across the diaphragm.

3. The device according to claim 2, wherein the control device sets the pressure drop across the diaphragm to at least one predetermined value.

4. The device according to claim 2, wherein the control device controls the pressure drop across the diaphragm by acting on a valve spring of the control valve.

5. The device according to claim 1, wherein the consumer has a pressure inlet, which is connected to the secondary side.

6. The device according to claim 1, wherein the valve element is acted upon in the opening direction by the pressure on the secondary side and in the closing direction by the pressure on the primary side.

7. The device according to claim 1, wherein the primary side has a fluid outlet arrangement, in which is arranged an adjustable throttle.

8. The device according to claim 7, wherein a shiftable valve is arranged in parallel with the throttle.

9. The water purification device of claim 1, wherein the pressure control device controls the pressure on the primary side so that the pressure on the secondary side is in a range from 35 to 180 bar.

10. The device according to claim 1, wherein the consumer has a valve, which opens at a predetermined minimum pressure.

11. A water purification device comprising:
    a fluid pump;
    a diaphragm unit having a diaphragm, which separates a primary side from a secondary side; and
    a consumer having a pressure requirement;
    wherein the fluid pump is connected with the primary side and the consumer is connected with the secondary side, and the fluid pump supplies the pressure for the consumer through the diaphragm;
    wherein the primary side is connected with a pressure control device, which controls the pressure on the primary side in dependence on the pressure on the secondary side;
    wherein the pressure control device includes a control valve arranged upstream of the diaphragm unit in a connection line between an outlet of the fluid pump and the primary side of the diaphragm unit; and
    wherein the control valve has a valve element, the valve element being acted upon by the pressure on the primary side in either an opening or a closing direction, and by the pressure on the secondary side in the other of the opening or the closing direction.

12. The water purification device according to claim 11, wherein the valve element is acted upon in the closing direction by the pressure on the primary side and in the opening direction by the pressure on the secondary side.

* * * * *